Patented Apr. 19, 1932

1,855,158

UNITED STATES PATENT OFFICE

GERRIT VAN DER LEE, OF DEVENTER, NETHERLANDS, ASSIGNOR TO NAAMLOOZE VENNOOTSCHAP INTERNATIONALE OXYGENIUM MAATSCHAPPIJ NOVADEL, OF DEVENTER, NETHERLANDS, A DUTCH COMPANY

TREATING EDIBLE MILLING PRODUCTS

No Drawing. Application filed May 11, 1929, Serial No. 362,455, and in the Netherlands May 19, 1928.

It has already been proposed to improve the color, the keeping and the baking qualities of flour and the like by treating said products with chlorine. Nitrogen trichloride ($NCl_3$) has also been proposed for this purpose. A drawback inherent in the use of chlorine, as has been noticed by many, is that the quantity thereof which must be used is very large, and partly as a result of this fact, detrimental secondary reactions may arise, such as an increased degree of acidity and poorer keeping qualities of the treated products (as compared with the untreated).

Nitrogen trichloride may be used in smaller quantities than chlorine to obtain useful effects, but a great drawback to the use of nitrogen trichloride is its highly explosive character. Various workers in this art have sought for a long time to overcome the objectionable features of the nitrogen trichloride process, but without entire success.

I have now found that advantages similar to those secured in the use of nitrogen trichloride, namely the strong action of small quantities of added chemicals may be obtained without the undesired side reactions, such as the increase of the degree of acidity and the decrease of the keeping qualities of the flour and the like. The said desired results may be obtained without any danger from explosions, by treating the grain, flour, meal and milling products with halogenated amines. Of these, the simplest compounds are monochlor-amine, $NH_2Cl$, and dichlor-amine, $NHCl_2$, or mixtures thereof. These or various other halogenated amines can be employed.

The halogenated amines are found to have a strong bleaching effect upon the flour and the like, they destroy the bacteria and the molds or else greatly retard their action, and they have a favorable influence upon the strength (baking qualities) of the flour.

The present invention accordingly relates to the treatment of grain, flour, meal, flour- and milling-products and has in particular for its purpose the maturing, the improvement of the color, the keeping qualities and the baking qualities of these substances. According to my invention, prior to, during or (preferably) after milling the grain a small quantity of one or more halogenated amines is added to the grain or flour, etc. Various substances belong to this class have been found to be useful for this purpose. Firstly the simple chlorinated inorganic amines, chloramine ($NH_2Cl$) and dichlor-amine ($NHCl_2$), may be used as above stated. Secondly the halogenated organic amines, in particular those derived from para toluolsulfonic acid ($CH_3.C_6H_4.SO_3H$) and from para sulfobenzoic acid ($COOH.C_6H_4.SO_3H$) have given especially good results, e. g., the following halogenated amines of this type (including also the salts of said acids) are particularly mentioned as being very suitable for the purpose:—

Para dichloraminosulfobenzoic acid $COOH.C_6H_4.SO_2NCl_2$
Para toluol dichloraminosulfonic acid $CH_3.C_6H_4.SO_2NCl_2$
Para dibromaminosulfobenzoic acid $COOH.C_6H_4.SO_2NBr_2$
Para toluol dibromaminosulfonic acid $CH_3.C_6H_4.SO_2NBr_2$
Para monochloraminosodiumsulfobenzoic acid $COOH.C_6H_4.SO_2NClNa$
Para monobromaminopotassiumsulfobenzoic acid $COOH.C_6H_4.SO_2NBrK$
Para toluol monochloraminosodiumsulfonic acid $CH_3.C_6H_4.SO_2NClNa$
Para toluol monobromaminopotassiumsulfonic acid $CH_3.C_6H_4.SO_2NBrK$ In stead of the acids the corresponding salts of harmless metals such as potassium, sodium or calcium may be used. In the same way the hydrogen of the $-COOH$ group may be replaced by potassium, sodium or calcium or any other harmless metal.

Another group of halogenated amines is formed by the derivatives of urea, such as dichlorurea, $CO(NHCl)_2$, a solid white substance, very useful for the purpose described.

According to their nature the halogenated amines may be added to the flour either as a gas or vapor, as a liquid, or in solution or suspension in water or any other suitable liquid, or as a solid, or as a combination of two or more of these methods. It will be understood that in adding a liquid or solution or suspension, a spray is used (e. g. the liquid may be atomized) in order to get a fine division of the material. For giving an intimate mixture with the milling product, the solid substances are preferably added in a finely powdered state. Suitable fillers, such as flour, phosphates, carbonates, oxides, etc. may be used to facilitate the incorporation of the small quantities of the halogenated amines.

It is obvious that it is also possible to add the substances to one or more of the constituents of the dough instead of executing the treatment in the flour mill. The following illustrative examples are given, for explaining the invention:—

*Example I.*—Wheat flour is intimately mixed with 0.012% of para toluol dichloraminosulfonic acid, $CH_3.C_6H_4.SO_2NCl_2$ (calculated on the weight of the flour).

*Example II.*—Rye flour is intimately mixed with 0.010% of the sodium salt of para dibromaminosulfobenzoic acid. 

*Example III.*—Wheat flour is intimately mixed with 0.009% of dichlorourea, $$CO(NHCl)_2.$$

*Example IV.*—Aqueous solutions of sodium hypochlorite and ammonia are mixed in proportions corresponding to the equation:

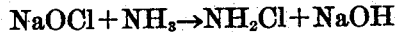

Preferably the sodium hydroxide is partly neutralized by the addition of an acid, such as hydrochloric acid, in order to prevent the decomposition of the chloramine formed.

By blowing air through the reaction mixture mentioned above, the air becomes charged with chloramine. In an agitator flour is intimately mixed with the chloramine-air mixture.

*Example V.*—Hypochlorous acid is substituted for the sodium hypochlorite in Example IV. (The hypochlorous acid can if desired be prepared by introducing chlorine gas into a dilute solution of sodium carbonate). Thus a higher yield of $NH_2Cl$ is obtained than in Example IV.

The process according to my invention may be successfully applied in combination with other well known treatments of grain, flour, meal, flour- and milling-products, e. g. a treatment with organic peroxides or other peroxidized organic compounds, persalts, chlorine, nitrogen trichloride, nitrogen peroxide, etc.

The improvements of the baking qualities is especially observed with low grade flours which in general have a poor baking strength, i. e. they give a dough and bread of unsatisfactory quality. After treatment with the halogenated amines (one or several), these flours yield a loaf that both as to color, volume and crumb texture is markedly better than the loaf manufactured from untreated flour.

In general a quantity of 1 to 20 grams of $NH_2Cl$ or of $NHCl_2$, or mixtures thereof (or of the other halogenated amines), per 100 kilos of the product to be treated, will do. (Greater amounts can be used if desired, but usually 8 to 12 grams is sufficient.) The dark colored products such as the low grade flours require a larger quantity than do the patent flours.

With a particular grade of flour having a rather dark color (the ash content being 0.82 per cent) this was treated with 0.01 per cent of monochlor amine in accordance with the disclosure of Example V. The treatment was by blowing air through the reaction mixture to give a mixture of the chlor amine vapor and air, which was then passed into contact with the flour in an agitator 7 meters long in which the flour was brought into good contact with the air-vapor mixture. The treated flour was found to have been very largely bleached immediately after leaving the agitator. The baking qualities of this flour were found to be very considerably improved so that a loaf of good texture was produced, having a size about 15 per cent better than that of a loaf poduced from the untreated flour. In the treated flour no harmful increase of acidity was observed on storage, showing the improved keeping qualities.

The solid materials should preferably be used in a high degree of fineness, e. g. having dimensions of $20\mu$ or less. In using solid materials, solutions, suspensions or emulsions for the treatment a better improvement of the properties of the flour is obtained if the flour is allowed to stand, after the contact with the materials, e. g. for one or two days. In using gaseous or vaporous halogenated amines this period of rest is unnecessary.

What I claim is:

1. A process for the treatment of grain, flour, mean, flour- and milling-products which comprises intimately mixing these materials with a small amount of a halogenated amine.

2. A process for the treatment of grain, flour, meal, flour- and milling-products which comprises intimately mixing these materials with a mixture of halogenated amines.

3. A process for the treatment of grain, flour, meal, flour- and milling products which comprises intimately mixing these materials with monochloramine.

4. A process for the treatment of grain, flour, meal, flour- and milling-products which comprises intimately mixing these materials with a mixture of monochloramine and dichloramine.

5. A processs for the treatment of grain, flour, meal, flour- and milling-products which comprises intimately mixing these materials with a mixture of a halogenated amine and nitrogen trichloride.

6. A process for the treatment of grain, flour, meal, flour- and milling-products which comprises intimately mixing these materials with a mixture of monochloramine, dichloramine and nitrogen trichloride.

7. A process for the treatment of grain, flour, meal, flour- and milling-products which comprises intimately mixing these materials with a halogenated organic amine.

8. A process for the treatment of grain, flour, meal, flour- and milling-products which comprises intimately mixing these materials with a mixture of halogenated organic amines.

9. A process for the treatment of grain, flour, meal, flour- and milling-products which comprises intimately mixing these materials with a halogenated para sulfamino benzoic acid.

10. A process for the treatment of grain, flour, meal, flour- and milling-products which comprises intimately mixing these materials with a salt of a halogenated para sulfamino benzioc acid.

11. A process for the treatment of grain, flour, meal, flour- and milling-products which comprises intimately mixing these materials with a halogenated para toluolsulfamide.

12. A process for the treatment of grain, flour, meal, flour- and milling-products which comprises intimately mixing these materials with dichlorourea.

13. A process for the treatment of grain, flour, meal, flour- and milling-products which comprises intimately mixing these materials with a mixture of at least one halogenated amine and at least one percompound.

In testimony whereof I affix my signature.

GERRIT van der LEE.